United States Patent
Orend

[11] 3,759,113
[45] Sept. 18, 1973

[54] ROLLER THREADED SPINDLE WITH NUT

[76] Inventor: Friedrich Orend, An der Wick 2, 3353 Bad Gandersheim, Germany

[22] Filed: Mar. 4, 1971

[21] Appl. No.: 120,920

[30] Foreign Application Priority Data
Mar. 4, 1970 Germany .................. P 20 09 984.7

[52] U.S. Cl. ............................................. 74/424.8
[51] Int. Cl. .............................................. F16h 1/18
[58] Field of Search ............................... 74/424.8 R

[56] References Cited
UNITED STATES PATENTS

| | | | |
|---|---|---|---|
| 2,938,400 | 5/1960 | Gondek | 74/424.8 R |
| 3,055,230 | 9/1962 | Strassberg | 74/424.8 R |
| 3,056,311 | 10/1962 | Musser | 74/424.8 R |
| 2,512,369 | 6/1950 | Norris | 74/424.8 R |
| 2,714,005 | 7/1955 | Wise | 74/424.8 R |
| 3,184,987 | 5/1965 | Beatty | 74/424.8 R |
| 3,434,357 | 3/1969 | Roantree | 74/424.8 R |

FOREIGN PATENTS OR APPLICATIONS

| 500,281 | 11/1954 | Italy | 74/424.8 R |
|---|---|---|---|

Primary Examiner—C. J. Husar
Attorney—Watson, Cole, Grindle & Watson

[57] ABSTRACT

A threaded spindle which transmits axial thrust to a nut disposed for a relative rotation thereon, through rollers, the nut having an endless raceway of zero pitch around its inner periphery with the rollers disposed for simultaneous engagement with opposing flanks of the raceway and the screw thread to transmit axial thrust resulting from relative rotation of the screw and nut, the raceway being in the shape of an Archimedean spiral having sufficient clearance at diametrically opposed locations on opposite sides of the screw for the rollers to disengage from and move axially across the crest of the thread of the screw incident to their movement around the raceway.

12 Claims, 6 Drawing Figures

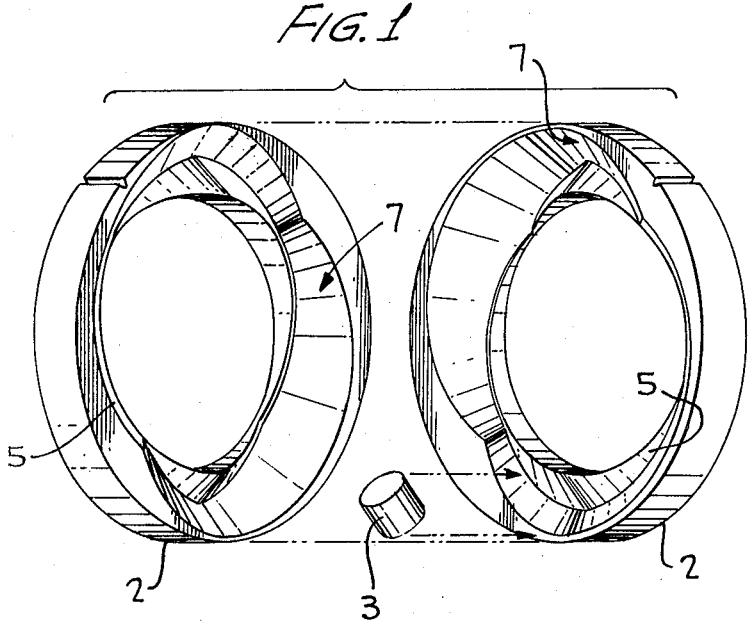
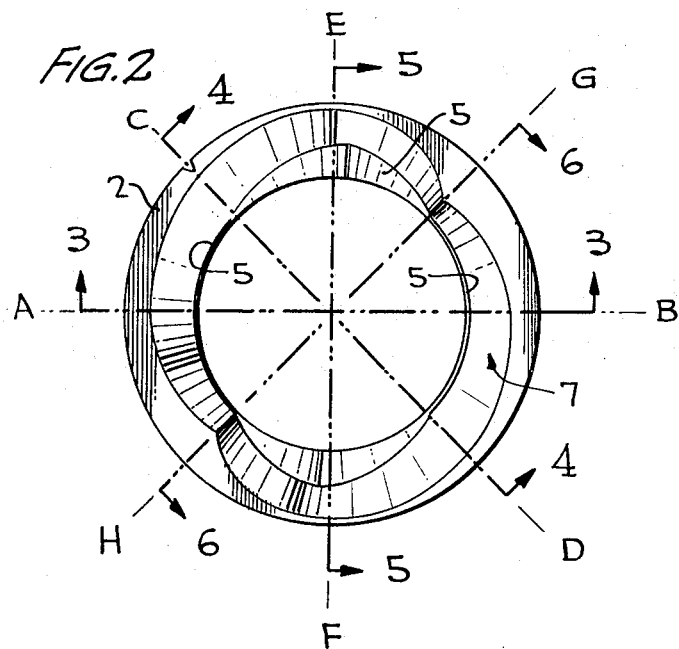
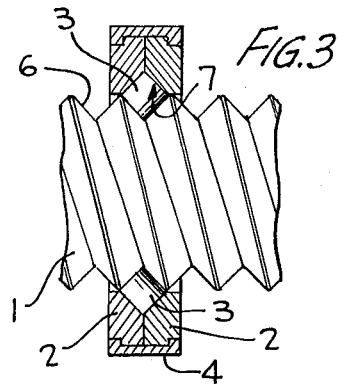
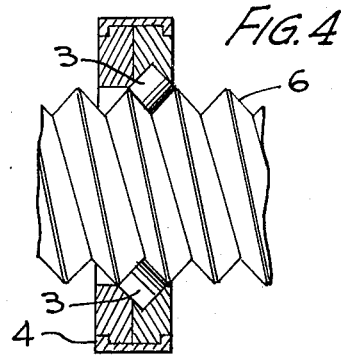
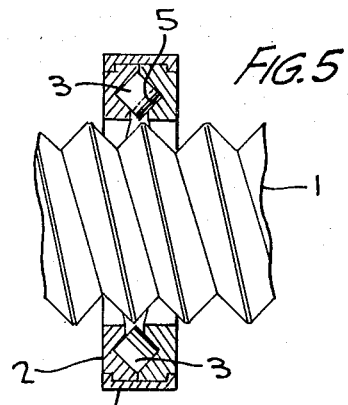
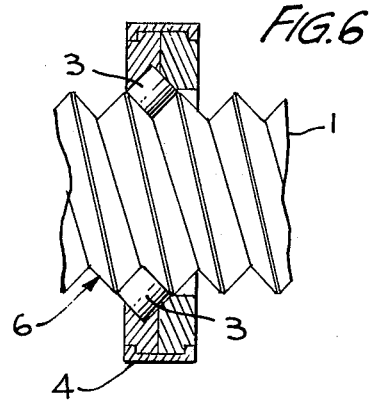

ROLLER THREADED SPINDLE WITH NUT

Roller threaded spindles have become known under the name of "ball revolving spindle." Such spindles are described in the U.S. Pat. Nos. 3,056,311 and 3,156,133. These known roller threaded spindles have the drawback that, through the use of balls, only a point contact takes place at the flanks of the nut and threaded spindle. Besides that, the manufacture, particularly the grinding of the nut after hardening, is very difficult and thus production is very expensive. Another difficulty is the geometric shape of the profile track which is composed of two eliptic arches.

In the case of the design according to French Pat. No. 1,399,664, cylindrical rollers are used in place of balls, which permit a higher load of the threaded spindle as well as of the nut through a line contact between rollers and flank; in this case, however, the necessity of a return channel for the rollers is disadvantageous. The geometric shape of the thread (profile track) in the case of this design is relatively simple. Even in this case, as in the case of all nuts known up to this time, the main difficulties in the manufacture of the nut has not been solved, which consists in that in a relatively small bore it is necessary to tool a number of threads of the highest surface quality and precision of shape. Besides, the nut—due to the return channel for the rollers—must be built with a very large diameter. But precisely in regard to the dimensions, there are quite considerable requirements for a roller threaded spindle in machine tool construction and particularly in the case of steering mechanisms in the construction of motor vehicles.

It is an object of the invention to create a roller threaded spindle which will guarantee a high precision of lead having simple manufacturing methods, complete freedom of play and great efficiency. The roller threaded spindle is capable of being built quite compactly for use in installations where but minimum space is available.

According to the invention, this will be achieved through the fact that the radially variable thread is determined in its shape by an Archimedean spiral. As a result of that, one will achieve even in the case of use of cylindrical roll bodies, which perform line contact with the cooperating threads and therefore are capable of absorbing higher loads, constant contact between the threaded spindle and the nut. A return channel for the roll bodies becomes superfluous.

It is particularly advantageous to make the thread radially and axially variable. That is to say, the thread is made at the same time radially and axially rising and declining or else rising or declining in a displaced manner. The Archimedean spiral may be repeated corresponding to the number of threads.

In a further development of the invention, the nut has been subdivided into at least two nut parts or segments and each of these segments contains a thread or, in the case of a multi-thread spindle, a corresponding number of threads. The nut parts are divided radially in the middle.

In order to prevent the roll bodies from rolling out of the thread, two bridges or retainer flanges have been provided on each nut part which enclose the roll bodies in the manner of a cage. The nut parts are held together by a ring so that the nut constitutes a rigid unit.

Because of the segmental formation of the nut, the manufacture of the roller threaded spindle is very simple. The halves of the nut can be produced for example by way of a compression flow process. A high degree of precision of the lead can be achieved. Through the use of cylindrical roll bodies in connection with the Archimedean spiral and the division of the nut, it is possible to construct a very compact roller threaded spindle with the greatest precision and reliability.

It is also possible to use instead of cylindrical roll bodies, roll bodies with a conic, convex or spherical shape with corresponding development of the thread and of the threaded spindle or lead screw.

As a result of the crossing rotational axes of the roll bodies or rollers and the development of the thread in the shape of an Archimedean spiral, high radial and axial forces can be absorbed by a compact arrangement. A return channel for the roll bodies is not necessary.

The preferred embodiment of the invention will be explained in more detail in the following description, in conjunction with the accompanying drawing, in which:

FIG. 1 is a perspective view of the nut produced in half sections in accordance with the present invention showing the interior of each section spaced apart for clarity and showing a typical roll body within the raceway;

FIG. 2 is a plan perspective view of one of two identical half-sections showing the interior thereof; and FIGS. 3 to 6 are sectional views taken along the lines 3—3 to 6—6 of FIG. 1, respectively, of the nut in its various relationships to the threads of a spindle.

Halves or segments 2 of a nut run on a two-start threaded spindle 1, which enclose between them cylindrical roll bodies 3 with crossing axes of rotation and which are held together by a ring 4. Instead of the cylindrical roll bodies 3, one can also use roll bodies with a conic, convex or spherical shape with corresponding development of the thread and the threaded spindle. A radially and at the same time axially variable development of the profile of the thread or raceway 7 of the nut is also particularly favorable (as shown in the drawing), whereby it is also possible to develop it with zero pitch radially rising and declining. As a result of that, the loading capacity will be greatly increased.

FIGS. 1 and 2 each show the thread of raceway 7 of the nut corresponding to the shape of an Archimedean spiral in each half or segment 2 of the nut, increasing in radius from A to E and decreasing in radius from E to B.

In FIG. 3, a section through the threaded spindle 1 and the nut has been shown along the line 3—3 of FIG. 2. A ring 4 holds the nut halves 2 together. At least two such halves or segments 2 constitute the nut, and these together with the roll bodies or rollers 3 and the threaded spindle or lead screw 1 constitute the roller threaded spindle. On each of the two nut halves 2, a bridge or retainer flange 5 has been provided to retain the roll bodies 3 in the raceway 7.

As a result of that, it is possible to put together assembly elements from halves of partial nuts closed with roll bodies, which corresponding to the pertinent load, are put together from two, four, six or even more partial nuts and which are inserted without play on the threaded spindle through axial tension. Naturally, it is possible to use merely a single nut consisting of two nut halves of a partial nut held together by ring 4 as in the drawing for use in the case of small loads.

FIG. 4 is a cross-section taken along line 4—4 of FIG. 2, indicating how at this location, roll bodies 3 have moved radially outwardly from the root circle of the screw thread without being displaced axially from the raceway 7 of the nut, which raceway has zero pitch.

In FIG. 5, it will be seen that the roll bodies 3 are located by the retainer flange or bridge 5 out of contact with the screw thread while moving axially across its crest. From the largest diameter of the Archimedean spiral (FIG. 4), the rollers or roll bodies 3 roll from the addendum circle via the root circle to a point, shown in section 4—4, on the opposite flank of the bridge of the threaded spindle 1, as shown in section 6—6 in FIG. 6.

The rollers 3 guided by the nut 2 unroll along the flanks of the raceway 7 in such a way—corresponding to the lead—that the roll bodies unroll from the root circle of the profile of the threaded spindle, via the addendum circle on the opposite flank of the thread bridge again to the root circle. That is to say, the roll bodies rise around the axial lead path of the threaded spindle in the nut radially to the largest diameter of the Archimedean spiral, and then unroll on the opposite flank of the bridge to the root circle of the threaded spindle. A nut with a purely radial lead is to be used both for the right-hand rising and left-hand rising threaded spindle in the same way, whereby it is irrelevant whether there is employed a one-threaded or multiple threaded spindle.

Thus, on their return path, the roll bodies or rollers function to support the nut against tilting on the screw.

It will thus be seen that the spindle or lead screw 1 is of circular cross-section with an external thread 6 of given pitch thereon. The nut 2 which is disposed for relative rotation in telescoping relation on the screw is formed around its inner periphery with an endless raceway 7 of zero pitch with the plurality of rollers 3 (only one of which is shown in FIG. 1 for clarity) operatively disposed in the raceway for movement therearound. It will be particularly noted that the thread 6 and the raceway 7 are each of substantial V-shape in cross-section, having its opposite flanks at right angles to each other, the opposite flanks of each thread respectively being parallel to the opposite flanks of the raceway. Further, it will be noted that each roller 3 is of cylindrical configuration with opposite axial end faces at right angles to its cylindrical surface, or in other words, disposed normally to its cylindrical axis. At least some of the rollers 3 are arranged with the cylindrical surface of each in simultaneous rolling engagement with a flank of the screw thread 6 and an opposing parallel flank of the raceway 7, while others of the rollers have their opposite axial end faces in simultaneous abutting engagement with another flank of the screw thread and another relatively parallel flank of the raceway 7. It will be further noted that the raceway is in the form of an Archimedean spiral as is best illustrated in FIG. 1, having its maximum diameter in the plane 5—5 of FIG. 2. At the diametrically opposed locations 5—5 in FIG. 1, the race way has sufficient clearance with the screw thread 6 that the rollers, as they move outwardly on the flank of the screw-thread in approaching the locations E and F will move completely off of the thread flank to become completely disengaged from the thread 6, as indicated in FIG. 5, and thereafter to move radially inwardly into engagement with the opposite flank of the thread during their continued movement through and past the points or locations E and F, respectively.

It will thus be apparent that the rollers will be operative to transmit an axial thrust between the lead thread and the nut at all locations around the circumference of the lead screw except at and adjacent the maximum diameter locations E, F of the raceway, where the rollers are temporarily disengaged from the lead screw during their transitional movement across the thread crest from one flank of the thread to the other.

In this application, there is shown and described only the preferred embodiment of the invention, simply by way of illustration of the practice of the invention, though it is to be recognized that the invention is capable of other and different embodiments and that its details may be changed in various ways without departing from the scope of the invention as defined in the appended claims.

Having thus described my invention, I claim:

1. A roller threaded spindle with a nut, roll bodies guided by said nut, said nut being provided with a raceway of zero pitch which at first increases radially and then diminishes radially, in which the roll bodies maintain a constant contact with the threaded spindle and the nut, characterized in that the radially variable raceway is in the form of an Archimedean spiral.

2. A roller threaded spindle according to claim 1, characterized in that the thread is radially and axially variable.

3. A roller threaded spindle according to claim 1, characterized in that the Archimedean spiral is repeated corresponding to the number of threads.

4. A roller threaded spindle according to claim 1, characterized in that the nut is formed of two identical half sections, and in that one of these sections defines a part of said raceway.

5. A roller threaded spindle according to claim 4, characterized in that the nut sections are divided along a plane of symmetry normal to the rotational axis of said nut.

6. A roller threaded spindle according to claim 4, characterized in that bridges on the nut sections enclose the roll bodies in the manner of a cage.

7. A roller threaded spindle according to claim 4, characterized in that the nut sections are held together by a ring.

8. A roller threaded spindle according to claim 7, characterized in that the nut constitutes a rigid unit free of axial and radial play between the respective nut sections.

9. The combination of a lead screw of circular cross-section, having a thread of given pitch thereon, a relatively rotatable nut in telescoping relation on the screw, the nut having an endless raceway of zero pitch around its inner periphery; and a plurality of rollers operatively disposed in said raceway for movement therearound to transmit an axial thrust between said screw and said nut; the improvements wherein said thread being V-shaped in a cross-section, said thread and said raceway having opposite flanks at right angles to each other; each said roller being of cylindrical configuration with opposite axial end faces at right angles to its cylindrical surface, at least some of said rollers having their cylindrical surfaces in simultaneous rolling engagement with a flank of said screw thread and a flank of said raceway; and others of said rollers having their opposite axial end faces in simultaneous engagement with the flank of said screw thread and a flank of said raceway; said raceway being in the shape of an Archimedean spiral proportioned to leave sufficient clearance with the lead screw at diametrically opposed locations for the rollers to disengage from and move axially across the crest of the screw thread.

10. The combination defined in claim 9 in which said nut includes retainer flanges overlying said raceway adjacent said diametrically opposed locations to retain the rollers in said raceway.

11. The combination defined in claim 10, in which the lead screw has a plurality of said threads and the nut has a corresponding plurality of said raceways.

12. The combination defined in claim 9, in which said nut is of composite construction, comprising a pair of separate segments disposed symmetrically to each other on opposite sides of a plane of symmetry which extends normally to the axis of relative rotation of said screw and said nut, the said segments respectively being formed to define the relatively opposing flanks of said raceway, and means for securing said segments in their symmetrical relationship.

* * * * *